July 27, 1965 H. H. DA MOUDE 3,197,705

MODULATOR SHAPER FOR FREQUENCY SHIFT TRANSMITTER

Filed April 25, 1962 2 Sheets-Sheet 1

INVENTOR.
HOMER H. DA MOUDE

BY

ATTORNEYS

MODULATOR SHAPER FOR FREQUENCY SHIFT TRANSMITTER

Filed April 25, 1962 2 Sheets-Sheet 2

INVENTOR.
HOMER H. DA MOUDE
BY
ATTORNEYS

United States Patent Office 3,197,705
Patented July 27, 1965

3,197,705
MODULATOR SHAPER FOR FREQUENCY SHIFT TRANSMITTER

Homer H. Da Moude, 8466 Abilene Terrace, La Mesa, Calif.

Filed Apr. 25, 1962, Ser. No. 190,181
12 Claims. (Cl. 325—163)
(Granted under Title 35, U.S. Code (1952), sec. 266)

The invention described herein may be manufactured and used by or for the Government of the United States of America for governmental purposes without the payment of any royalties thereon or therefor.

This invention pertains to a shaping circuit and more particularly to a circuit for shaping a pulse-coded signal.

Frequency-shift keying, recongized as $E_1$ emission by the U. S. Federal Communications Commission, is radio telegraphy without the use of a modulating audio frequency. In accordance with this form of emission, a different carrier frequency is transmitted for each separate state or condition. For example, if there are two states and one represents a dot and the other a dash, then carrier frequency $f_1$ is transmitted for dots and carrier frequency $f_2$ is transmitted for dashes. As the carrier is alway present in frequency-shift keying, an improved signal-to-noise ratio is realized over "on-off" keying.

In the past, frequency-shift keying transmitters have employed one oscillator for each separate frequency to be transmitted, for they have employed one oscillator with means for switching its frequency. The frequency-shifting apparatus in each type of transmitter is elaborate and involves numerous components.

It is an object of this invention to provide apparatus for converting an ordinary phase-modulated transmitter to a means for transmitting $F_1$-type emission.

It is an object of the invention to provide apparatus that enables remote operation of the modulator and transmitter.

It is an advantage of the invention that an ordinary phase-modulated transmitter having no D.-C. response, such as a police communication transmitter, may be employed.

Other object and advantages of the invention will be apparent from a study of the following specifications, read in connection with the accompanying drawings, wherein.

Figure 1:
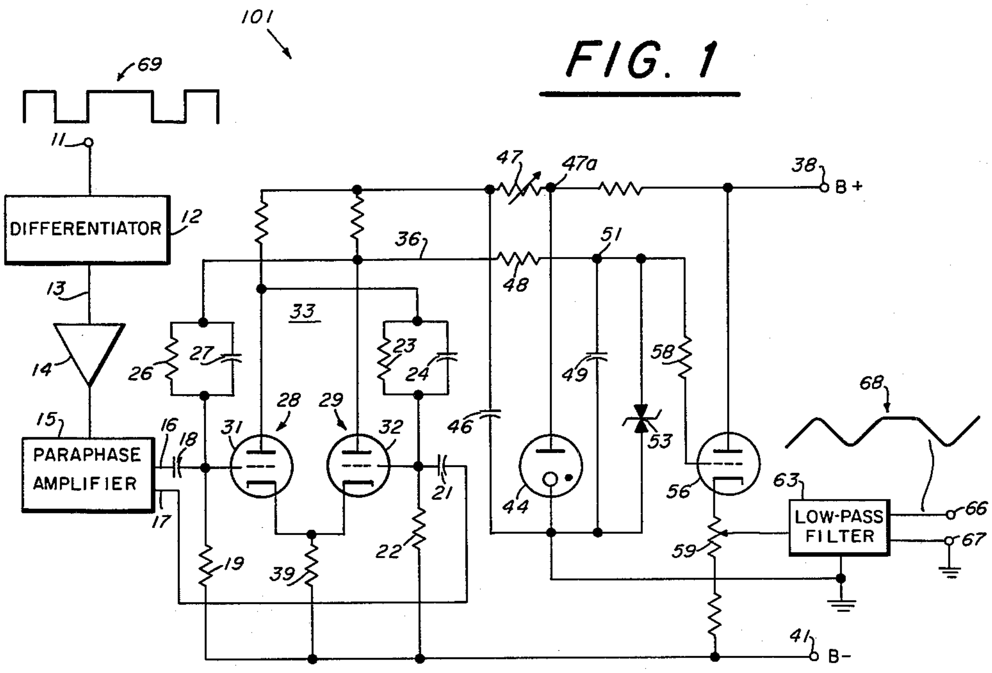
FIG. 1 is a circuit diagram of shaping apparatus in accordance with the invention.
Figure 3:
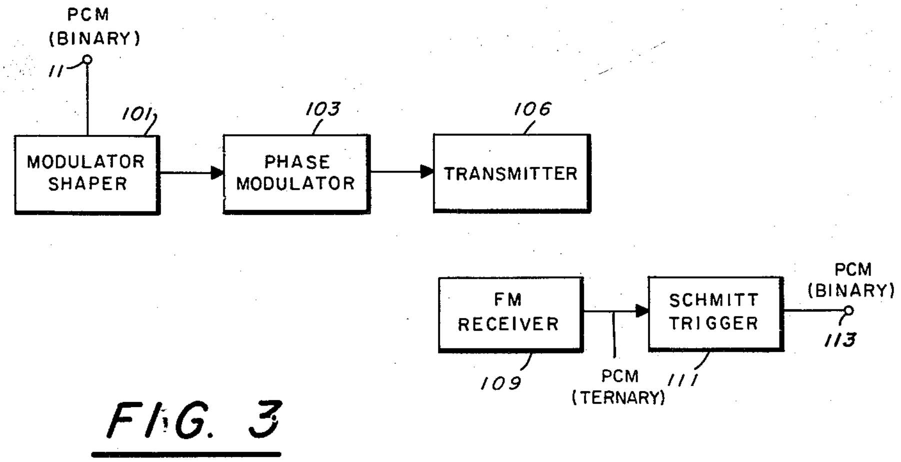
Figure 4:
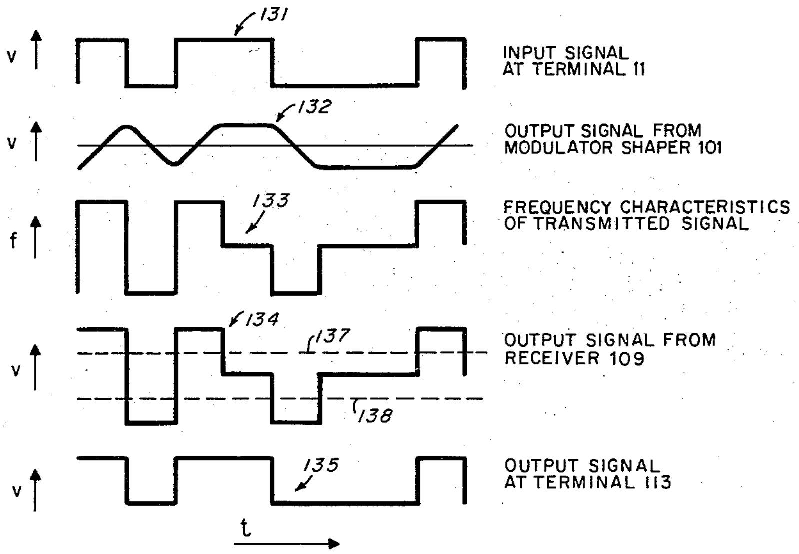

FIG. 3 schematically depicts a transmitting-receiving system utilizing the apparatus of FIG. 1; and FIG. 4 is a diagrammatic representation of a number of exemplary waveforms occurring within the system of FIG. 3.

FIG. 1 schematically illustrates a shaping circuit in accordance with the invention. If a transmitter is phase-modulated, a signal of constant frequency (shifted away from the carrier frequency) will be produced as long as the phase of the carrier is shifted linearly with respect to time. Thus, it is apparent that frequency-shift keying can not be effected by directly impressing a rectangular waveform on the phase modulator of the phase-modulated transmitter. The apparatus of FIG. 1 is equipped with a differentiator 12 having an input terminal 11. A rectangular-wave signal, for example a Morse-coded signal or a Baudot-coded signal, impressed on input terminal 11 is differentiated in differentiator 12 to permit ease of transmission to the succeeding stages. The resulting differentiator output signal, comprising a series of negative and positive voltage spikes is transmitted to amplifier 14 by means of transmission line 13. As a differentiated rectangular-wave signal can be transmitted easier than a rectangular wave, transmission line 13 may be greatly extended to permit remote operation for the succeeding stages of the apparatus. For example, line 13 may be a twisted-pair line several miles long. The differentiated signal, after being amplified in amplifier 14, is amplified further in paraphase amplifier 15. Paraphase amplifier 15 has two outputs, outputs 16 and 17. The signal on output 16 is 180° out of phase with the signal produced on output 17. Thus, if a positive-going pulse is produced on output 16 a negative-going pulse is simultaneously produced on output 17. Amplifier 28 is crossover-coupled to the input of amplifier 29 by means of resistors 22 and 23 and crossover capacitor 24. The output of amplifier 29 is crossover-coupled to the input of amplifier 28 by means of resistors 19 and 26 and crossover capacitor 27. Collectively, these two amplifiers form a flip-flop circuit 33. Capacitor 18 and resistor 19 differentiate the input signals to amplifier 28 and likewise capacitor 21 and resistor 22 differentiate the input signals to amplifier 29. Thus, when a positive-going pulse appears on output 16 a negative-going pulse appears on 17. The positive-going pulse is differentiated by differentiating circuit comprising capacitor 18 and resistor 19 and a very sharp positive-going voltage spike is impressed on the grid of electron tube 31 in amplifier 28. The positive-going voltage spike on the grid of tube 31 causes tube 31 to conduct and the plate voltage on that tube to drop. This drop is reflected to the grid of tube 32 and amplifier 29 by means of the coupling circuit comprising resistor 23 and capacitor 24. The plate voltage drop appears as a negative-going pulse on the grid of tube 32 and cuts off tube 32 and stops it from conducting. The negative-going pulse on output 17 is differentiated in differentiating circuit comprising resistor 22 and capacitor 21. The differentiated signals appear as very sharp negative-going voltage spike on the grid of tube 32. This negative-going voltage spike further ensures that tube 32 is cut off when tube 31 starts to conduct. When tube 32 stops conducting the plate voltage of tube 32 increases and a positive-going pulse appears on line 36.

A positive D.-C. voltage applied to terminal 38 from a power supply (not shown) supplies the plate voltage for the electron tubes 31 and 32. A negative D.-C. voltage applied to terminal 41 from a power supply (not shown) maintains the cathodes of tubes 31 and 32 at a negative potential. The cathode resistor 39 of tubes 31 and 32 is tied to terminal 41. The magnitude of the positive voltage applied to terminal 38 is preferably slightly larger than the magnitude of negative voltage applied to terminal 41.

Voltage regulator tube 44 is connected between ground and point *47a* so as to regulate the voltage at point *47a*. Potentiometer 47 provides means for adjusting the plate voltage on tubes 31 and 32. The potentiometer functions as a symmetry control and adjusts the output signals on line 36 so that the positive and negative excursions of the plate voltage of 32 are equally disposed on each side of ground. Capacitor 46 is a bypass capacitor and functions to bypass noise on the positive voltage line produced by voltage regulator tube 44 and other sources.

Figure 2:
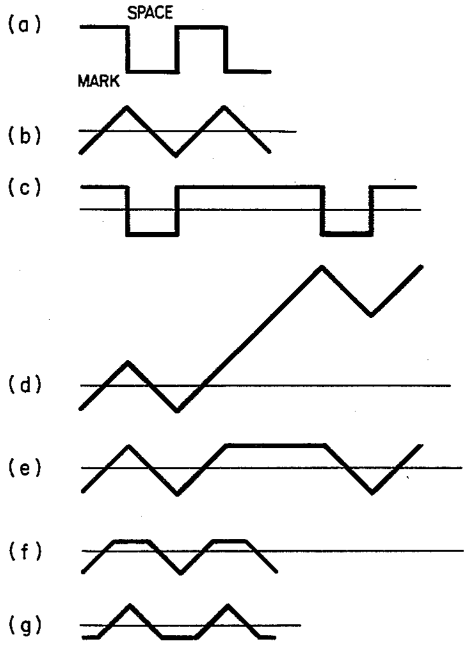
FIG. 2 illustrates waveforms that are useful in describing the operation of the apparatus of FIG. 1.

In a phase-modulated transmitter a constant frequency output (shifted from the carrier frequency) is produced when the phase is shifted linearly with respect to time. That is, frequency shift is equal to the rate of change of phase and if the rate of change of phase is constant the frequency shift will become constant. An integrating network comprising resistor 48 and capacitor 49 produces a voltage waveform with linear slopes having attitudes corresponding to the rise and fall of the output signal from flip-flop 33. The time constant of the integrating circuit is very small with respect to the duration of the dot cycle of the input information impressed on input terminal 11. If, for example, the dot cycle of the input signal is 500 cycles then the period is 2 milliseconds and one bit has a duration of one millisecond. If the time constant of the integrating circuit is approximately one-fifth the duration of one bit which would be 200 microseconds in this case, the resultant waveform from the integrating circuit will be a waveform with a linear slope. Thus, if a square wave such as shown in FIG. 2*a* comprised of marks and spaces is imposed on input terminal 11 the plate terminal of tube 32 will swing above and below ground, a square-wave voltage will be produced on line 36 and a triangular wave signal such as shown in FIG. 2*b* will be produced at the output of the integrating circuit at point 51. Thus, it is apparent that when the input signal impressed on input terminal 11 is a square wave the output of the integrating circuit will be an A.-C. voltage. However, when the input signal impressed on input terminal 11 is a triangular wave the output signal from the integrating circuit will be a D.-C. voltage. Suppose, for example, the input signal impressed on input terminal 11 had the configuration illustrated in FIG. 2*c*. Then, the output signal from the integrating circuit comprising resistor 48 and capacitor 49 would have a D.-C. signal as illustrated in FIG. 2*d*. The conventional phase-modulated transmitter, for erample, those used in police and taxi communication systems, are equipped to accommodate audio frequencies and are not capable of handling a D.-C. voltage input. Thus, such a transmitter would be incapable of handling a D.-C. voltage such as that shown in FIG. 2*d*.

A double-anode Zener diode 53 is placed in parallel with capacitor 49 of the integrating network. The positive and negative avalanche breakdown points of this diode are chosen so as to correlate with the positive and negative voltage values obtained during one bit duration. Thus. positive and negative voltage excursions at the output of the integrating circuit are limited and a trapezoidal waveform is produced whenever two or more spaces or marks are adjacent to each other. Thus, when the input signal impressed on input terminal 11 has a waveform as shown in FIG. 2*c*, the Zener diode 53 limits the excursions of the output signal from the integrating circuit so that a signal having the waveform shown in FIG. 2*e* is actually produced.

The output signals from the integrator and the double-anode Zener diode 53 are coupled to cathode follower 56 by means of coupling resistor 58. Potentiometer 59 in the cathode circuit of electron tube 56 serves as an amplitude control as well as a cathode resistor and is used to adjust the level of the triangular or trapezoidal output signal. The output of cathode follower 56 passes through low-pass filter 63. Low-pass filter 63 passes the first five harmonics of the output signal from the cathode follower and rejects the higher harmonics. The filter rounds off the apexes of the waveform. This has the effect of making the phase reversals more gradual and tends to reduce the bandwidth of a signal that is eventually transmitted from the phase-modulated transmitter. Waveform 68 depicts the waveform produced at output terminals 66 and 67 when a pulsed-code waveform 69 is impressed on input terminal 11.

As was stated above, potentiometer 47 functions as a symmetry control. When this potentiometer is adjusted properly, the plate voltage on electron tubes 31 and 32 is such that the output signal from flip-flop 33 is symmetrical with respect to ground. That is, the output signal on line 38 has equal positive and negative excursions. For example, if the input signal is a square wave having a waveform such as shown in FIG. 2*a*, the output from cathode follower 56 is as shown in FIG. 2*b* when the symmetry control 47 is properly adjusted. When potentiometer 47 is improperly adjusted and the plate voltage on tubes 31 and 32 is excessive, the output signal produced at cathode follower 56 has a waveform such as that shown in FIG. 2*f*. Note that the signal is off-centered and the major portion of the signal is above the zero voltage line and the peaks of the waveform are clipped. When potentiometer 47 is improperly adjusted and the plate voltage on the tubes in the flip-flop is too low, the output signal at cathode follower 56 has a waveform similar to that shown in FIG. 2*g*. In this instance the major portion of the signal is below the zero voltage line and the bottom of the form is clipped.

FIG. 3 illustrates a block diagram of a transmitting-receiving system employing a modular shaper 101 in accordance with the invention. The apparatus of FIG. 3 is equipped with a transmitter 106. Transmitter 106 is modulated in accordance with signals emanating from phase modulator 103. Binary-coded signals, for example, teletype or telegraph signals, impressed on input terminal 11 are shaped in modulator shaper 101 before entering phase modulator 103. The output signal from transmitter 106 is frequency-shifted keyed in conformance with the input signal impressed on 11. The signal transmitted by transmitter 106 is received by FM receiver 109 and the output of this receiver is fed to a Schmitt trigger 111. Signals emanating from the FM receiver pulse coded, however, they are ternary coded rather than binary coded. Schmitt trigger 111 is adjusted so as to have sufficient back-lash as to switch states only during the extreme excursions of the input signal emanating from FM receiver 109. As a result, the output signal from Schmitt trigger 111 is binary coded and has the same configuration as the input signal impressed on input terminal 11 in the transmitting system. It should be appreciated that other types of squaring circuits may be employed in place of Schmitt trigger 111. Of course, if ternary-coded signals are desired, Schmitt trigger 111 may be completely omitted.

FIG. 4 illustrates various waveforms that are found in the system of FIG. 3 when it is in operation and an input signal having the following bit configuration is impressed on input terminal 11: 1-0-1-1-0-0-0-1. Time is the abscissa for all of the curves. Voltage is the ordinate for waveforms 131, 132, 134 and 135. Frequency is the ordinate for waveform 133. Observing waveform 133, it is apparent that transmitter 106 always produces a signal having one of three frequencies. The natural carrier frequency of transmitter 106 is produced when the output signal from shaper 101 has a constant amplitude. Dotted lines 137 and 138, associated with waveform 134, shows suitable voltage levels for the triggering or switching states of Schmitt trigger 111.

Obviously many modifications and variations of the present invention are possible in the light of the above teachings. It is, therefore, to be understood that within the scope of the appended claims the invention may be practiced otherwise than as it is specifically described.

What is claimed is:

1. In combination a phase modulator and apparatus for pre-shaping a phase modulator input signal wherein said signal to be shaped is a pulse-code modulated signal, said apparatus comprising means having an input and an output for differentiating said pulse-code modulated signal, means for amplifying a signal having an input and first and second outputs, the signal a said first output being 180 degrees out of phase with the signal at said second output, means for coupling said differentiating means output to said input of said amplifying means, a bistable pulse generator having two trigger inputs and an output, said first and second outputs of said amplifying means being coupled to said inputs of said bistable pulse generator, respectively, means for limiting the positive and negative excursions of a signal, said limiting means having an input and an output, integrating means coupled between said output of said bistable pulse generator and said input of said limiting means, said output of said limiting means being coupled to said phase modulator.

2. Apparatus in accordance with claim 1 wherein said limiting means comprises a double-anode Zener diode and the limited signal has a trapezoidal waveform.

3. Apparatus is accordance with claim 1 wherein said means for coupling said output of said differentiating means to said input of said amplifying means comprises a long transmission line.

4. Apparatus in accordance with claim 1 additionally including a symmetry control, said symmetry control being coupled to said pulse generator and being adapted to shift the output signal from the limiting means with respect to ground potential.

5. In combination in a frequency-shift keying transmitting system, a modulator, apparatus for shaping a binary-coded signal, comprising a differentiator having an input and an output, said differentiator input being adapted to receive said signal, a bistable pulse generator having first and second inputs and an output, means for coupling said differentiator output to said first and second inputs of said pulse generator, an integrator having an input and an output, the time constant of said integrator being small with respect to the duration of the dot cycle of said binary-coded signal, means for coupling the output of said pulse generator to said input of said integrator, means coupled to said integrator output for limiting the positive and negative excursions of the output signal from said integrator, a filter having an input and an output, means for coupling said integrator to said input of said filter, said output of said filter being coupled to said modulator.

6. Apparatus in accordance with claim 5 wherein said means for coupling said differentiator output to said inputs of said pulse generator includes a paraphase amplifier, and said filter is a low-pass filter.

7. In combination, a phase modulator, shaping apparatus adapted to precede the phase modulator of a phase-modulated transmitter wherein said apparatus input signal in a binary-coded signal and said transmitter emits $F_1$ emission, said shaping apparatus comprising means for differentiating said binary-coded signal, means coupled to said differentiating means for amplifying said differentiated signal, an integrator, a bistable pulse generator coupled between said amplifying means and said integrator, means coupled to said integrator for converting the output signal of said integrator to an A.-C. signal, and means for coupling said converting means to said phase modulator.

8. Apparatus in accordance with claim 7 wherein said integrator is a linear integrator, said last-named coupling means comprises a cathode-follower and a low-pass filter, said cathode follower being coupled between said converting means and said filter.

9. Apparatus for shaping a phase-modulator input signal so that phase is either shifted linearly with respect to time or not shifted at all, said signal to be shaped being a binary-coded signal, comprising differentiating means for converting said binary-coded signal to voltage spikes, means for amplifying said voltage spikes, means for coupling said differentiating means to said amplifying means, an integrator, a bistable pulse generator coupled between said amplifying means and said integrator, means coupled to said integrator for converting the output signal of said integrator to an alternating current signal, and means for applying said alternating current signal to said phase-modulator input.

10. Apparatus in accordance with claim 9 wherein said bistable pulse generator is a flip-flop having two trigger inputs, both of said inputs being coupled to said amplifying means.

11. Apparatus in accordance with claim 9 wherein said integrator has a time constant which is very small in comparison to the duration of a dot cycle of said binary coded signal.

12. Apparatus according to claim 9 wherein the second mentioned converting means comprises a double-anode Zener diode.

References Cited by the Examiner

UNITED STATES PATENTS

| | | | |
|---|---|---|---|
| 2,380,959 | 8/45 | Frankel | 325—163 X |
| 2,416,329 | 2/47 | Labin et al. | 323—15 |
| 2,802,941 | 8/57 | McConnell | 328—206 |
| 2,883,524 | 4/59 | Deise et al. | 325—163 |
| 2,924,712 | 2/60 | Edens. | |
| 2,981,893 | 4/61 | Agalides et al. | 328—206 |
| 3,072,854 | 1/63 | Case | 328—127 X |
| 3,095,539 | 6/63 | Bennett | 325—163 |
| 3,160,812 | 12/64 | Scantlin | 325—30 |

DAVID G. REDINBAUGH, *Primary Examiner.*

ALFRED BRODY, *Examiner.*